(12) United States Patent
Kanehisa (10) Patent No.: US 6,497,314 B2
(45) Date of Patent: Dec. 24, 2002

(54) BICYCLE HUB WITH SLIDING ENGAGEMENT MEMBER AND DETACHABLE FREEWHEEL

(75) Inventor: Takanori Kanehisa, Osaka (JP)

(73) Assignee: Shimano Inc., Osaka (JP)

(*) Notice: Subject to any disclaimer, the term of this patent is extended or adjusted under 35 U.S.C. 154(b) by 63 days.

(21) Appl. No.: 09/730,537

(22) Filed: Dec. 7, 2000

(65) Prior Publication Data

US 2002/0070604 A1 Jun. 13, 2002

(51) Int. Cl.⁷ .................. B62K 25/02; B60B 27/02
(52) U.S. Cl. ................ 192/64; 192/45; 301/110.5; 301/105.1
(58) Field of Search ................ 192/64, 41 R, 192/45, 45.1; 301/110.5, 105.1

(56) References Cited

U.S. PATENT DOCUMENTS

| | | | | |
|---|---|---|---|---|
| 3,554,340 A | * | 1/1971 | Shimano et al. | 192/64 |
| 4,567,973 A | * | 2/1986 | Butz | 192/64 |
| 5,494,390 A | | 2/1996 | Gonzales | 411/368 |
| 5,632,364 A | * | 5/1997 | Mercat | 192/46 |
| 6,264,285 B1 | * | 7/2001 | Yu | 192/64 |

FOREIGN PATENT DOCUMENTS

| | | |
|---|---|---|
| DE | 1155355 | 4/1964 |
| DE | 9218358 | 3/1994 |
| EP | 94649 | 11/1983 |
| EP | 890505 | 1/1999 |
| EP | 835188 | 9/1999 |
| FR | 1093378 | 5/1955 |
| FR | 2188551 | 1/1974 |
| FR | 2501124 | 9/1982 |
| FR | 2776612 | 10/1999 |
| GB | 572237 | 9/1945 |
| GB | 668943 | 3/1952 |
| IT | 596057 | 7/1959 |
| JP | 5551601 | 4/1980 |

* cited by examiner

Primary Examiner—Saul Rodriquez
(74) Attorney, Agent, or Firm—Shinjyu Global IP Counselors, LLP (57) ABSTRACT

A bicycle hub basically includes a hub axle, a hub body, a sprocket support member and an engagement member. The hub axle has first and second portions releasably coupled together. The hub body has an outer tubular portion and an interior passageway. The first portion of the hub axle is rotatably supported in the interior passageway. The sprocket support member is mounted on the second portion of the hub axle. The engagement member non-rotatably couples the outer tubular portion to the sprocket support member in an engaged position and is axially movable by the hub axle between the engaged position and a disengaged position. The hub body can be separated from the sprocket support member when the engagement member is in the disengaged position and the first and second portions of the hub axle are released from each other.

25 Claims, 10 Drawing Sheets

BICYCLE HUB WITH SLIDING ENGAGEMENT MEMBER AND DETACHABLE FREEWHEEL

BACKGROUND OF THE INVENTION

1. Field of the Invention

This invention generally relates to a bicycle hub with a detachable freewheel. More specifically, the present invention relates to a bicycle hub with a sliding engagement member provided on a two-part axle to allow separation of a sprocket support member from the hub body without removing the freewheel from the bicycle frame.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving the components of the bicycle. One particular component of the bicycle, which has been extensively redesigned over the past years, is the rear bicycle hub.

Specifically, most bicycles have several speeds. Accordingly, the rear bicycle hub usually includes a freewheel. The freewheel includes at least one chain engaging sprocket. One popular form of drive train and freewheel for a bicycle includes a plurality of sprockets that are mounted on the hub of the rear bicycle wheel. During pedaling, the bicycle chain engages one of the rear sprockets to rotate the rear wheel. When bicycle rider stops pedaling, the rear wheel should be able to continue to rotate while the sprockets remain stationary. Accordingly, the rear hub is usually provided with a freewheel that has a one-way clutch.

Freewheels are used to transmit a driving force to the rear bicycle wheel in one rotation direction only. These freewheels are usually mounted on the rear hub of a bicycle. Freewheels typically allow the bicycle to advance freely without any rotation of the pedals. Freewheels usually include boss type freewheels which are mounted on the boss of the rear hub by being screwed onto the rear hub, and free hub type freewheels which are fastened to the rear hub as integral parts of the rear hub. Both types of freewheels are equipped with an outer tubular part, an inner tubular part which is installed radially inwardly of the outer tubular part so that the inner tubular part is free to rotate relative to the outer cylinder part. A one-way clutch is installed between the outer tubular part and inner tubular part for transmitting the driving force from the outer tubular part to the inner tubular part in one rotational direction only. The outer tubular part usually has a plurality of gears mounted thereon, while the inner tubular part is usually mounted on the rear hub of the bicycle.

Splines are formed between the sprocket wheels and boss to prohibit relative rotation therebetween positively. Since this unit is used for the rear wheel of a bicycle, drive must be transmitted between the rear wheel axle and boss through a one-way mechanism. For this purpose, the boss is formed as an outer race of a one-way clutch, and the one-way clutch and inner race are disposed on an inner periphery of the boss.

With the increased number of speeds provided by a derailleur of a bicycle today, a multi-step sprocket wheel unit for the rear wheel includes an increased number of sprockets which is now usually at least five to seven. With the increased number of gears or sprockets, a wider range of torque can be applied from the sprockets to the freewheel. Often the sizes of the sprockets (i.e. the number of gear teeth on the sprockets) are configured for certain riding conditions, such as hilly or flat conditions. Moreover, the configuration of the sprockets or gears is designed for different rider skill levels or rider preferences. Accordingly, sometimes it is necessary to change freewheels or the entire rear wheel depending on the rider or riding conditions. Therefore, there are demands for a simplified mounting structure and an easy mounting method.

Furthermore, as the number of rear gears or sprockets have increased over the years, the freewheel has become larger and heavier. Additionally, with the increased number of gears or sprockets, rear hubs and freewheels can be complicated and expensive to manufacture and install. Moreover, with the increased number of gears or sprockets, it can be difficult to remove the rear wheel from the bicycle frame or to replace an existing freewheel with a different freewheel.

In view of the above, there exists a need for a bicycle hub with a detachable freewheel which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle hub with a sliding engagement member for a detachable freewheel that has a simplified structure.

Another object of the present invention is to provide a bicycle hub with a sliding engagement member for a detachable freewheel that allows simplified mounting.

Another object of the present invention is to provide a bicycle hub with a sliding engagement member for detaching a freewheel from a hub body that is relatively simple and inexpensive to manufacture and assemble.

The foregoing objects can basically be attained by providing a bicycle hub, comprising a hub axle, a hub body, a sprocket support member and an engagement member. The hub axle has a first portion and a second portion releasably coupled to the first portion. The hub body has an outer tubular portion and an interior passageway with the first portion of the hub axle being rotatably supported in the interior passageway. The sprocket support member is mounted on the second portion of the hub axle. The engagement member non-rotatably couples the outer tubular portion to the sprocket support member in an engaged position and is axially movable by the hub axle between the engaged position and a disengaged position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
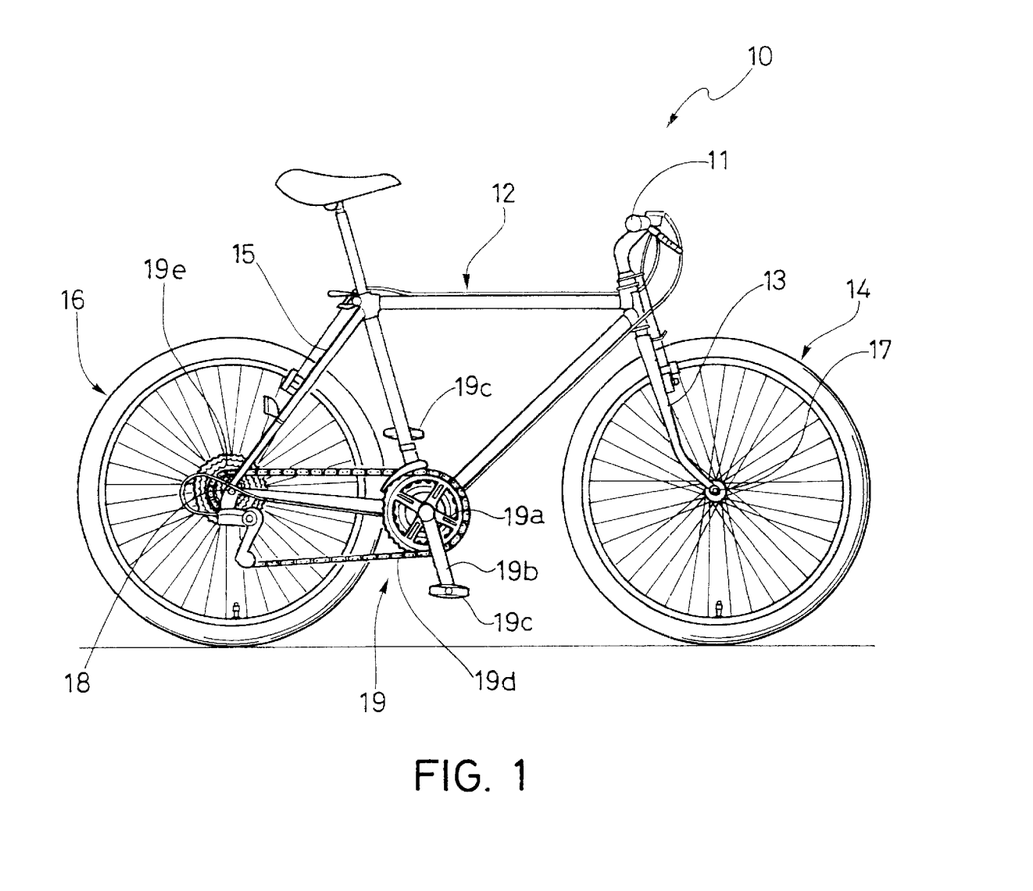
FIG. 1 is a side elevational view of a conventional bicycle with a rear bicycle hub in accordance with the present invention.
Figure 2:
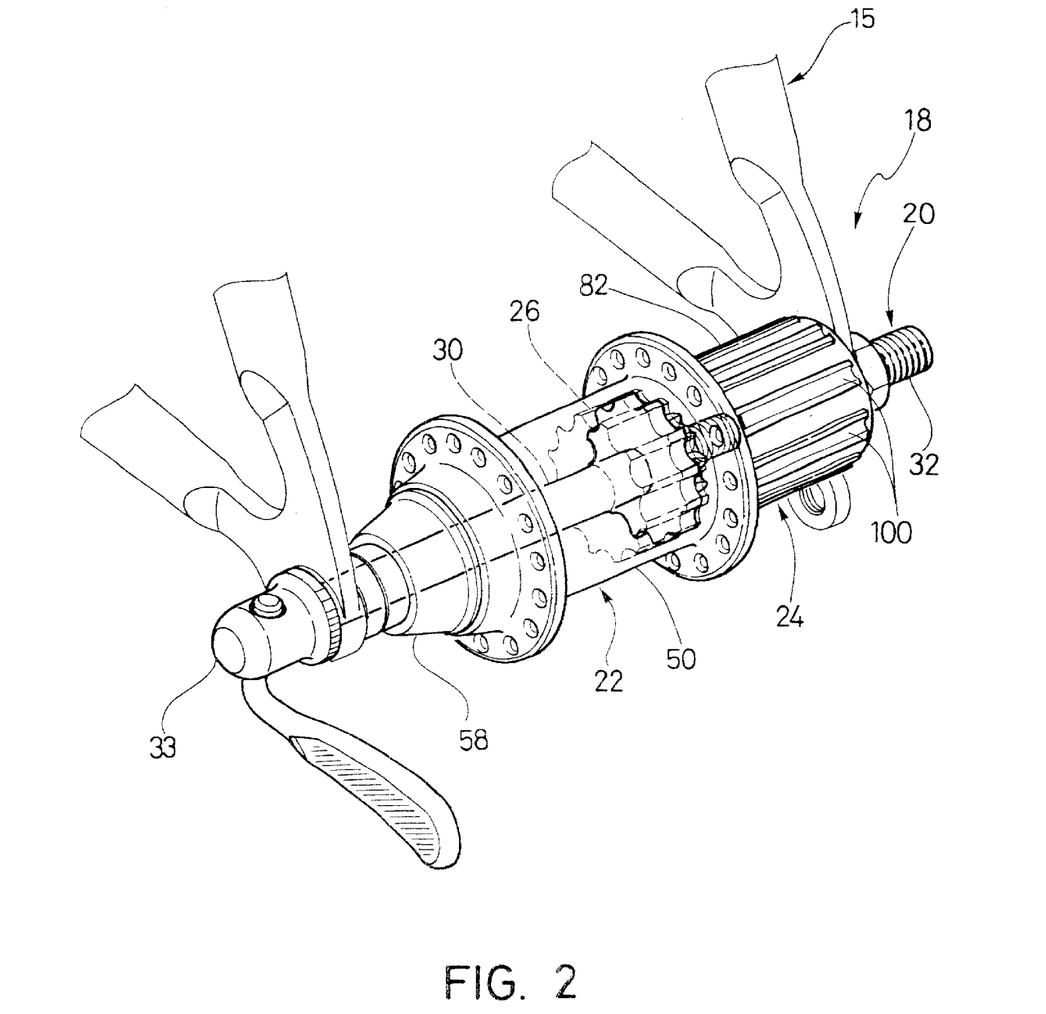
FIG. 2 is an enlarged perspective view of the rear hub mounted on the rear fork of the bicycle illustrated in FIG. 1 with an engagement member in accordance with the present invention located in a first position.
Figure 3:
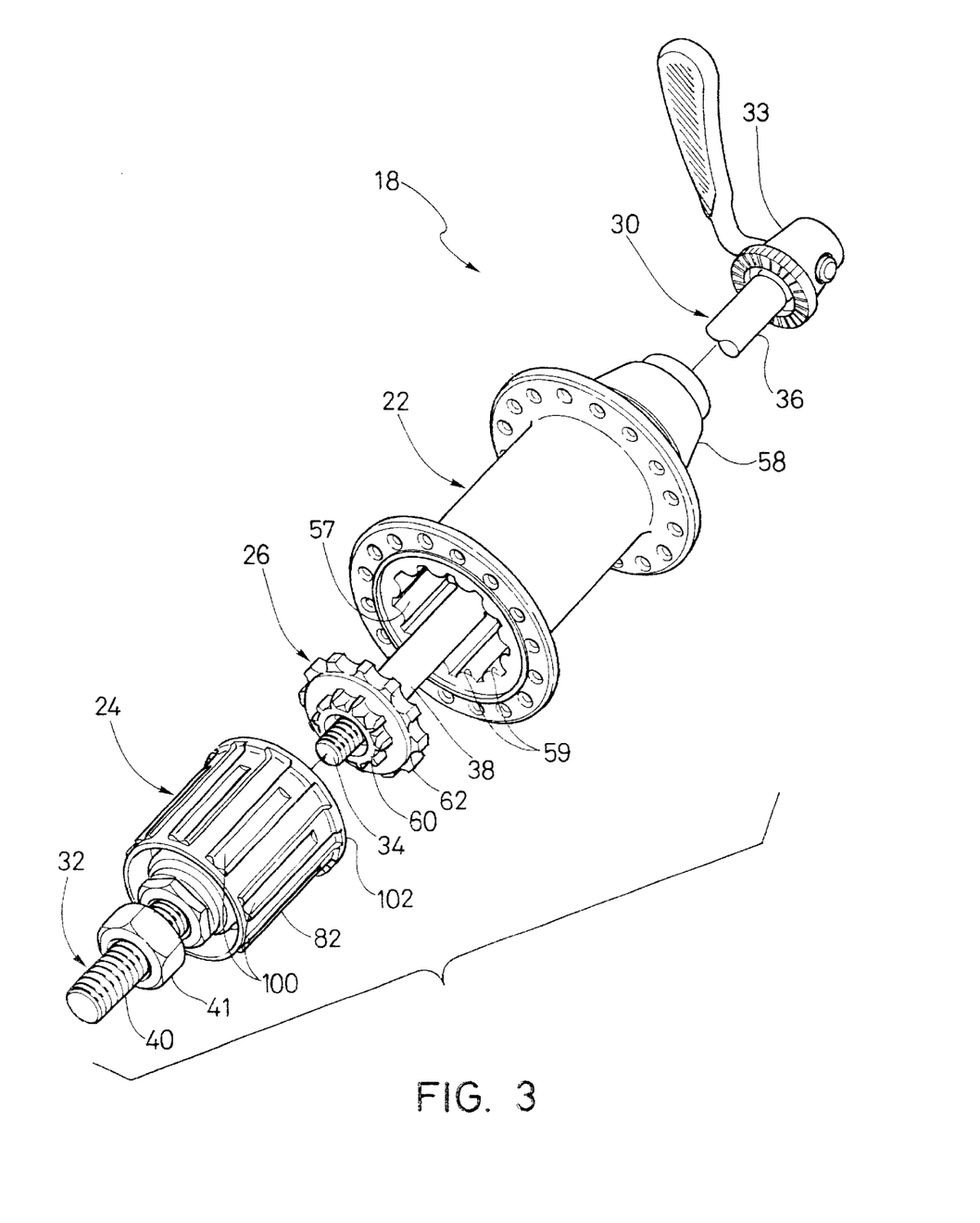
FIG. 3 is an enlarged, partially exploded, reverse perspective view of the rear hub illustrated in FIGS. 1 and 2.

Referring initially to FIG. 1, a bicycle 10 is illustrated with a rear hub 18 in accordance with the present invention installed thereon as discussed below. Bicycle 10 has a frame 12 with a front fork 13 movably coupled thereto and a rear fork 15 fixedly coupled thereto. A rear wheel 16 is rotatably coupled to rear fork 15 via a rear hub 18. A front wheel 14 is rotatably coupled to front fork 13 via a front hub 17. A seat is adjustably coupled to frame 12 and a handlebar 11 is coupled to front fork 13 for turning front wheel 14. A drive train 19 is coupled to frame 12 for propelling bicycle 10. Drive train 19 basically includes a front set of sprockets 19a, a pair of crank arms 19b with pedals 19c, a drive chain 19d and a set of rear sprockets 19e. Front sprockets 19a are rotatably coupled to frame 12 via a bottom bracket (not shown). Rear sprockets 19e are coupled to rear hub 18 of rear wheel 16 in a relatively conventional manner.

Since the various components of bicycle 10 are well known in the art, these parts will not be discussed or illustrated in detail herein, except as they are modified in accordance with the present invention. More specifically, components of bicycle 10 will not be discussed or illustrated herein, except as they relate to rear hub 18. Moreover, it will be apparent to those skilled in the art from this disclosure that various conventional bicycle parts such as brakes, derailleurs, additional sprockets, etc., which are not illustrated and/or discussed herein, can be used in conjunction with the present invention.

Referring now to FIGS. 2–6, rear hub 18 basically includes a hub axle 20, a hub body 22, a freewheel 24 and an engagement member 26. Hub axle 20 is rotatably supported within an interior passageway of hub body 22 and extends axially from both ends of hub body 22. Engagement member 26 non-rotatably couples a portion of hub body 22 to a portion of freewheel 24 in an engaged position, as discussed below in more detail. Engagement member 26 is axially movable by hub axle 20 between the engaged position and a disengaged position, as also discussed in more detail below. Hub axle 20 is preferably formed of two parts releasably coupled together so hub body 22 can be separated from freewheel 24. Moreover, engagement member 26 is preferably movably mounted to one part of hub axle 20, while freewheel 24 is preferably mounted on another part of hub axle 20 that separates from engagement member 26. Hub axle 20 is preferably formed of two parts threadedly coupled together to allow release of freewheel 24 from hub body 22 without removing freewheel 24 from rear fork 15. Of course it will be apparent to those skilled in the art from this disclosure that the present invention can be used with hubs that do not have a freewheel. Thus, the term "sprocket support member" is used herein to refer to a portion of the hub that has at least one sprocket with or without a freewheel.

Hub axle 20 basically includes a first portion 30 and a second portion 32. Second portion 32 is threadedly coupled to first portion 30 via a threaded connection, as best seen in FIGS. 2–7. Preferably, first portion 30 is rotatably supported within an interior passageway of hub body 22, while freewheel 24 is mounted on second portion 32 of hub axle 20. Moreover, first portion 30 is preferably threadedly coupled to second portion 32 such that first portion 30 can be separated from second portion 32. Preferably, hub axle 20 has a diameter large enough to provide enough strength for separable hub axle 20. More specifically, first portion 30 of hub axle 20 preferably has a diameter of about ten millimeters and second portion 32 preferably has a minimum diameter of about ten millimeters to provide adequate strength for separable hub axle 20.

Figure 7:
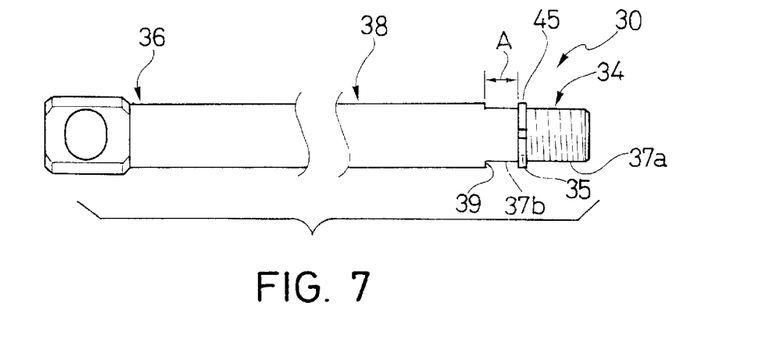
FIG. 7 is a side elevational view of the first portion of the hub axle of the hub illustrated in FIGS. 1–6.
Figure 8:
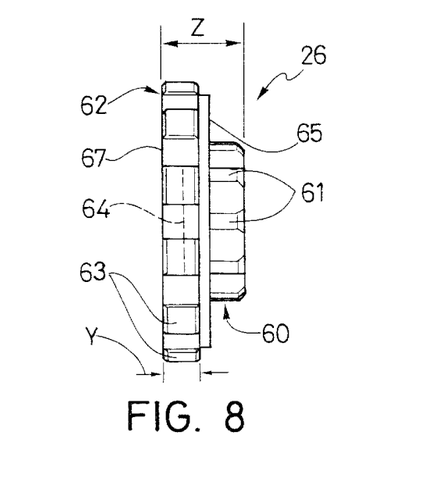
FIG. 8 is an enlarged side elevational view of the engagement member of the rear hub illustrated in FIGS. 1–6.
Figure 9:
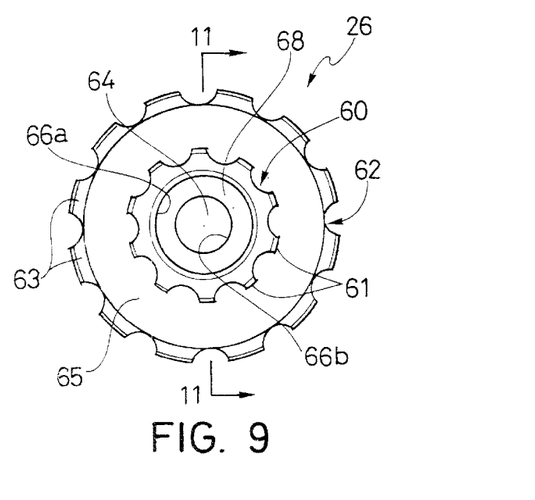
FIG. 9 is an end elevational view of the engagement member illustrated in FIGS. 8.
Figure 10:
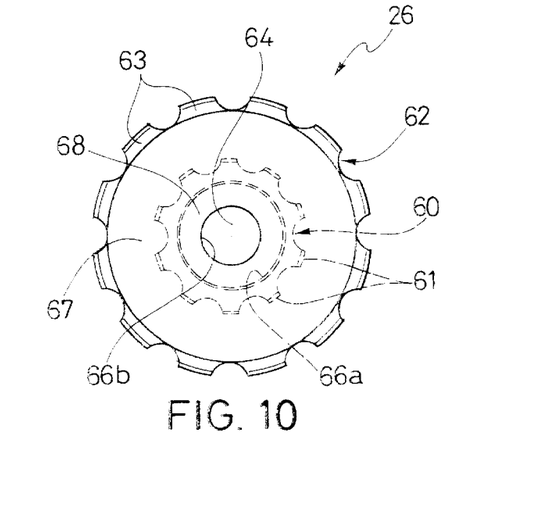
FIG. 10 is an opposite end elevational view of the engagement member illustrated in FIGS. 8 and 9.
Figure 11:
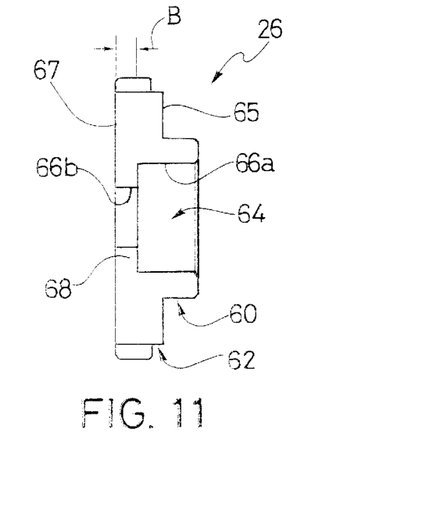
FIG. 11 is a cross-sectional view of the engagement member illustrated in FIGS. 8–10 as viewed along section line 11—11 of FIG. 9.

First portion 30 of hub axle 20 is preferably an elongate cylindrical member formed of lightweight, rigid metallic material, such as cast aluminum, titanium, or steel. Of course, first portion 30 could be constructed of any suitable material as needed and/or desired. Moreover, first portion 30 preferably has a stepped, circular cross-section with a diameter of about ten millimeters as mentioned above. First portion 30 of hub axle 20 includes a first end section 34, a second end section 36 axially spaced from first end section 34 and a central section 38 extending between first end section 34 and second end section 36.

First end section 34 is preferably provided with externally threaded surface 37a, an annular sliding surface 37b and an annular recess 35 arranged therebetween. Preferably, threaded surface 37a is provided with conventional clockwise threads for releasably coupling first portion 30 to second portion 32. An abutment shoulder 39 is formed between first end section 34 and central section 38. First end section 34 preferably has a slightly smaller diameter than central section 38 such that abutment shoulder 39 faces axially toward a free end of first end section 34.

Sliding surface 37b extends from abutment shoulder 39 toward threaded surface 37a. Recess 35 is located axially between sliding surface 37b and threaded surface 37a. Sliding surface 37b is sized and configured to have a portion of engagement member 26 freely rotatably and slidably arranged thereon. Abutment shoulder 39 is arranged to move engagement member 26 from the disengaged position to the engaged position as discussed in more detail below. A retaining ring 45 is preferably arranged in recess 35 to move engagement member 26 from the engaged position to the disengaged position when hub 18 is assembled, as discussed below in more detail. Retaining ring 45 is spaced an axial distance A from abutment shoulder 39. In other words, a pair of abutment surfaces formed by abutment shoulder 39 and retaining ring 45 are spaced an axial distance A from each other. The abutment surfaces are arranged to move engagement member 26 in two axially opposite directions.

Second end section 36 is configured such that a quick release mechanism 33 coupled thereto in a conventional manner. Thus, quick release mechanism 33 is used to couple one side of the rear hub 18 to the rear fork 15 in a relatively conventional manner as discussed in more detail below. Central section 38 has a generally cylindrical cross-section and extends from abutment shoulder 39 to second end section 36.

Figure 4:
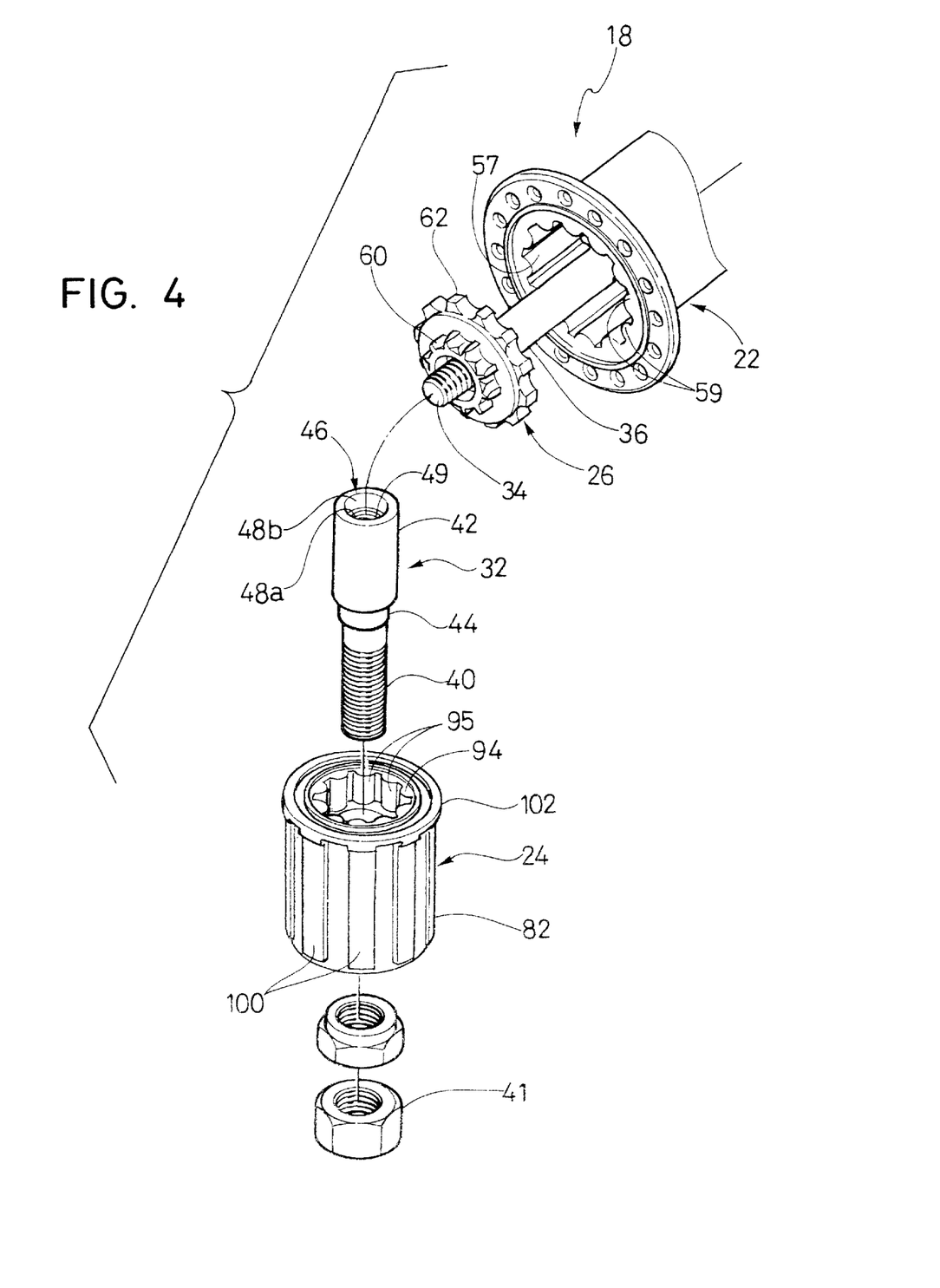
FIG. 4 is an enlarged, partially reversed, partially exploded perspective view of the rear hub illustrated in FIGS. 1–3.
Figure 5:
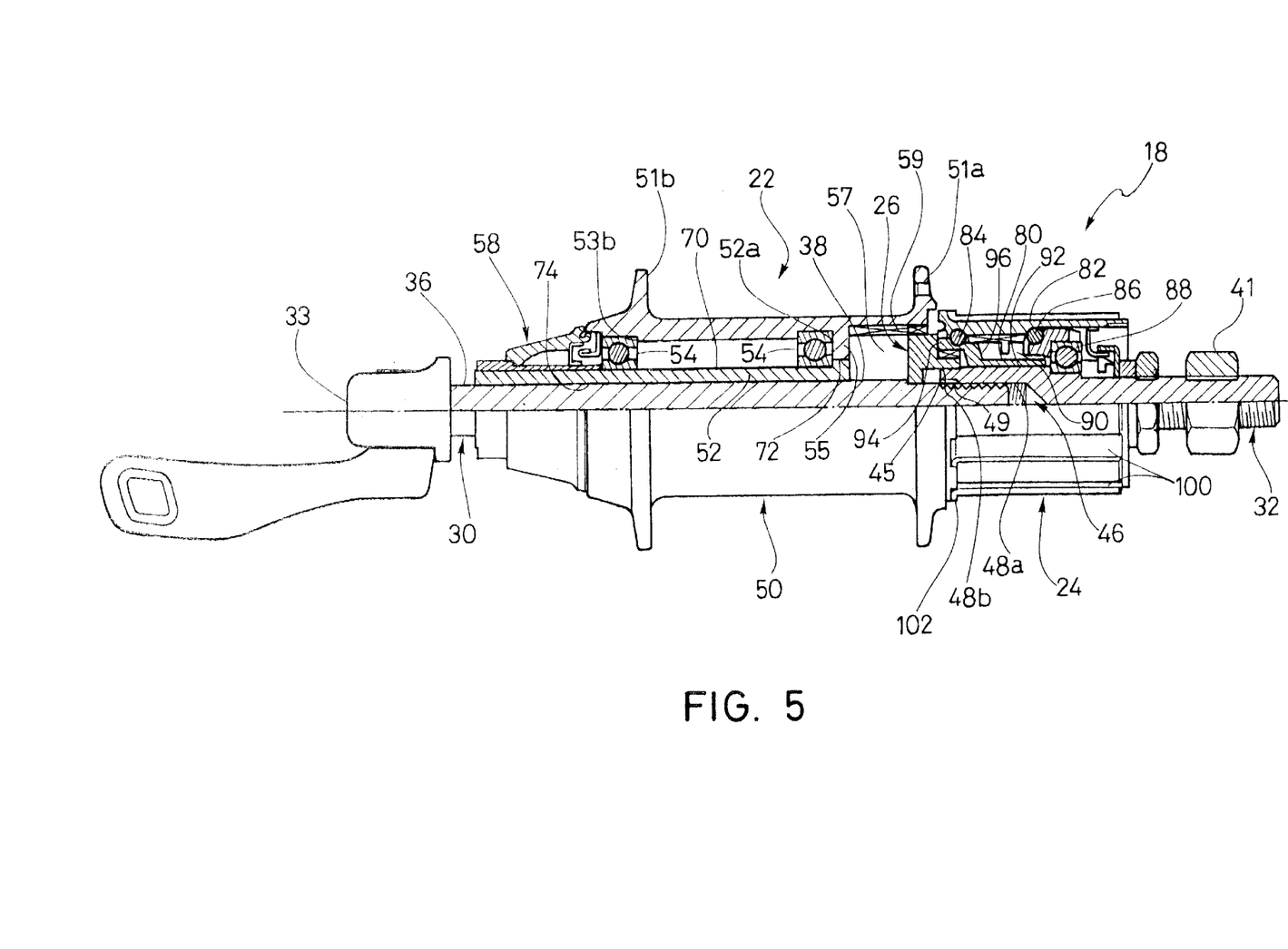
FIG. 5 is an enlarged, partial cross-sectional view of the assembled rear hub illustrated in FIGS. 1–4 with the engagement member in a first position.
Figure 6:
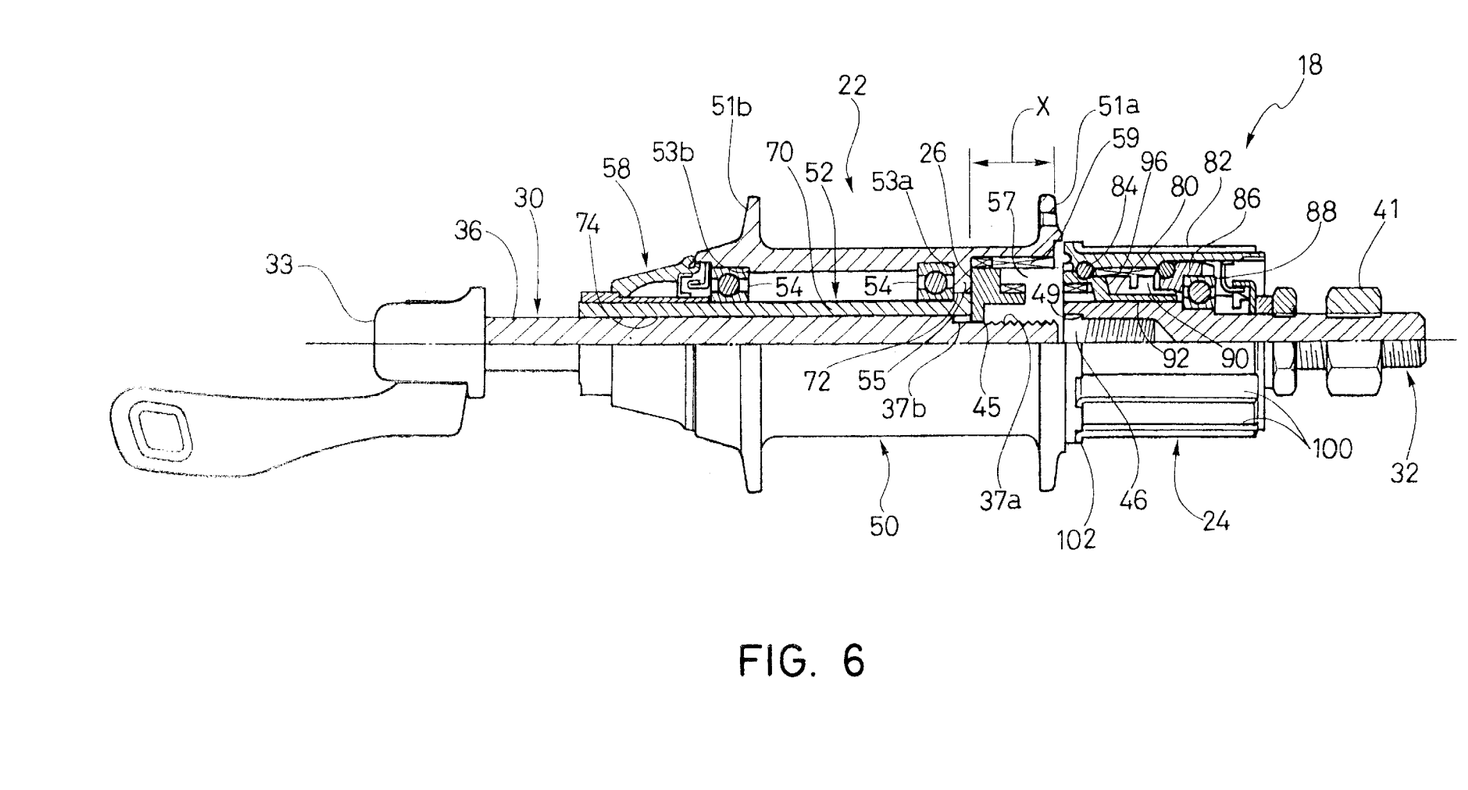
FIG. 6 is a partial cross-sectional view of the rear hub illustrated in FIG. 5 with the freewheel detached from the hub body and the engagement member in a second position.

Preferably, second portion 32 is a step-shaped cylindrical member having a varying cross-section for supporting freewheel 24, as best seen in FIGS. 4–6. Moreover, second portion 32 preferably has a minimum diameter of about ten millimeters and is preferably formed of lightweight, rigid metallic material, such as cast aluminum, titanium, or steel. Of course, second portion 32 could be constructed of any suitable material as needed and/or desired. Second portion 32 basically includes a first end section 40, a second end section 42 axially spaced from first end section 40 and a central stepped section 44 extending between first end section 40 and second end section 42.

First end section 40 is preferably provided with external threads for receiving a nut 41. Nut 41 is threadedly coupled to first end section 40 for coupling one side of rear hub 18 to rear fork 15 in a relatively conventional manner. Moreover, first end section 40 preferably has the smaller or minimum external diameter of second portion 32. The minimum external diameter of first end section 40 is preferably about ten millimeters as mentioned above. Second end section 42 preferably includes a bore 46 formed therein and extending to a free end thereof for receiving externally threaded first end section 34 of first portion 30. Preferably, bore 46 includes a threaded section 48a and an enlarged recessed section 48b. An abutment shoulder 49 is formed between threaded section 48a and recessed section 48b and faces axially toward first portion 30.

Threaded section 48a preferably has a clockwise threaded surface that is sized and configured to engage clockwise external threads of first end section 34. Accordingly, when first portion 30 is threadedly coupled to second portion 32, first and second portions 30 and 32 act as a single axle member.

Recessed section 48b has a slightly larger diameter than threaded section 48a such that retaining ring 45 does not contact second portion 32 when first and second portion 30 and 32 are threadedly coupled together and engagement member 26 is in the engaged position. The external surface of second portion 32 is sized and configured to support freewheel 24 or sprocket support member in a relatively conventional manner.

Referring still to FIGS. 2–6, hub body 22 basically includes an outer tubular portion 50, a tubular inner sleeve portion 52 and a pair of bearing assemblies 54 rotatably coupling inner sleeve portion 52 and outer tubular portion 50 together in a freely rotatable manner. First portion 30 of hub axle 20 is preferably rotatably supported by inner sleeve portion 52 within the interior passageway of outer tubular portion 50. Outer tubular portion 50 is preferably releasably and non-rotatably coupled to a portion of freewheel 24 (i.e. a sprocket support member of freewheel 24) by engagement member 26, as will be discussed in more detail below.

Outer tubular portion 50 is a tubular member with varying internal and external circular cross-sections, as best seen in FIGS. 5 and 6. Moreover, outer tubular portion 50 is preferably formed of lightweight, rigid metallic material, such as cast aluminum, titanium, or steel. Of course, outer tubular portion 50 could be constructed of any suitable material as needed and/or desired. Outer tubular portion 50 basically includes a pair of annular spoke mounting flanges 51a and 51b axially spaced from each other for coupling hub body 22 to the rim of wheel 16 via spokes in a conventional manner. Spoke mounting flanges 51a and 51b extend from opposite sides of outer tubular portion 50 and are adjacent free ends of outer tubular portion 50. Several spokes are coupled to mounting flanges 51a and 51b to secure hub body 22 to wheel 16 in a conventional manner.

Outer tubular portion 50 preferably includes a pair of abutment surfaces or abutment shoulders 53a and 53b facing in opposite directions for securing bearing assemblies 54 against longitudinal (axial) movement towards each other. Outer tubular portion 50 also preferably includes an annular internal flange 55 spaced axially toward freewheel 24 from abutment shoulder 53a and axially inward from the free end of outer tubular portion 50 to form a recess 57 adjacent freewheel 24. The opposite end (i.e. adjacent quick release mechanism 33) of outer tubular portion 50 is sized and configured to receive a cover assembly 58 in a relatively conventional manner. Cover assembly 58 is also mounted on inner sleeve portion 52 to retain one of the bearing assemblies 54 within outer tubular portion 50.

Recess 57 includes a plurality of radially inwardly extending axial teeth or splines 59 (i.e. a splined engagement section) for non-rotatably mating with engagement member 26. In other words, outer tubular portion 50 is preferably non-rotatably and slidably coupled to engagement member 26 when hub 18 is assembled. The splined engagement section formed by recess 57 and splines 59 has an axial length X.

As best seen in FIGS. 2–6 and 8–11, engagement member 26 is an annular member and is preferably formed of rigid metallic material, such as cast aluminum, titanium, or steel. Of course, engagement member 26 could be constructed of any suitable material as needed and/or desired. Engagement member 26 is preferably at least partially arranged in recess 57 when hub 18 is assembled. Retaining member 26 basically includes a pair of engagement portions 60 and 62 with a stepped through bore 64 extending axially through engagement portions 60 and 62. Engagement portion 60 has a smaller external diameter than engagement portion 62 and extends from on side of engagement portion 62. Thus, an external abutment surface 65 is formed between engagement portions 60 and 62.

External teeth or splines 61 are formed on the external surface of engagement portion 60. External teeth or splines 63 are formed on the external surface of engagement portion 62. The teeth or splines 63 are non-rotatably engaged with the matching/mating internal teeth or splines 59 of outer tubular portion 50 (i.e. within recess 57). Preferably, splines 63 of engagement portion 62 are sized and configured to be slidably and non-rotatably received in recess 57 such that splines 63 mesh with splines 59. Splines 61 of engagement portion 60 are sized and configured to non-rotatably and slidably engage a portion of freewheel 24. Accordingly, outer tubular portion 50 is releasably and non-rotatably coupled to a portion of freewheel 24 by engagement member 26 when hub 18 is assembled and first and second portions 30 and 32 are coupled together.

Bore 64 is a stepped bore with an enlarged section 66a and a sliding section 66b. Engagement portion 62 has an annular contact portion 68 extending radially inward to form stepped bore 64. Contact portion 68 is arranged between abutment shoulder 39 and retaining ring 45 when hub 18 is assembled. Engagement portion 62 has an abutment surface 67 formed at a free edge thereof. Abutment surface 67 contacts internal flange 55 to prevent removal of first portion 30 from hub body 22 after hub 18 is assembled and a retaining ring 45 is mounted in recess 35 of first end section 34. Contact portion 68 is arranged at the abutment surface 67 side of engagement portion 62 such that sliding section 66b is also adjacent abutment surface 67. Sliding section 66b has a slightly larger internal diameter than the external diameter of first end section 34 of first portion 30 of hub axle 20. Accordingly, engagement member 26 rotates with outer tubular portion 50 about first portion 30 via bearing assemblies 54.

Contact portion 68 has an axial thickness B less than the axial distance A between abutment shoulder 39 and retaining ring 45 to allow limited relative axial movement of engagement member 26 on the first portion 30 of hub axle 20. More specifically, contact portion 68 preferably has an axial length B of about one half the axial distance A between abutment shoulder 39 and retaining ring 45. Moreover, engagement portion 62 has and axial length Y smaller than axial length X of the splined engagement section formed by recess 57 and splines 59. Engagement portion 62 can be considered a first engagement portion, while engagement portion 60 can be considered a second engagement portion. Furthermore, engagement member 26 preferably has a maximum axial length Z that is smaller than axial length X of the splined engagement section formed by recess 57 and splines 59 of outer tubular portion 50. This arrangement allows engagement member 26 to be retracted into recess 57.

Referring to FIGS. 5 and 6, bearing assemblies 54 are relatively conventional assemblies, and basically each includes an inner race, a plurality of bearings or spherical steel balls and an outer race. Each outer race contacts an internal surface of outer tubular portion 50 and an abutment shoulder 53a or 53b of outer tubular portion 50 to secure bearing assemblies 54 against axial movement, as discussed above. Each inner race preferably contacts an external surface of inner sleeve portion 52 such that inner sleeve portion 52 is freely rotatable relative to outer tubular portion 50.

Inner sleeve portion 52 is preferably an elongated tubular member with an external step shaped circular cross-section. Additionally, inner sleeve portion 52 is preferably formed of lightweight, rigid metallic material, such as cast aluminum, titanium or steel. Of course, inner sleeve portion 52 could be constructed of any suitable material as needed and/or desired. Inner tubular portion 52 basically includes a supporting section 70, an annular external flange 72 and a through bore 74 extending therethrough.

Supporting section 70 rotatably supports bearing assemblies 54 in a relatively conventional manner. External flange 72 extends radially outwardly from supporting section 70 at an axial location corresponding to the axial location of internal flange 55 of outer tubular portion 50. Thus, internal and external flanges 55 and 72 together form an abutment surface or stop surface for limiting axial movement of engagement member 26. Through bore 74 is preferably slightly larger than the external diameter of first portion 30. Therefore, first portion 30 is freely rotatable and axially movable within through bore 74.

Figure 12:
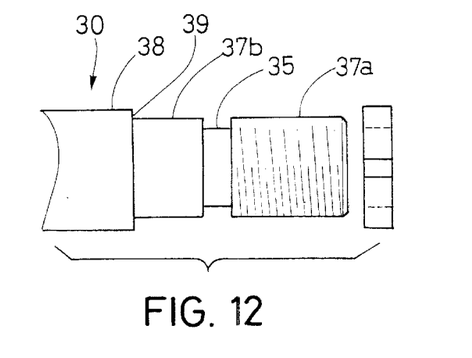
FIG. 12 is an enlarged partial side elevational view of a first portion of the hub axle and a retaining member of the hub illustrated in FIGS. 1–6 in accordance with a preferred embodiment of the present invention.
Figure 13:
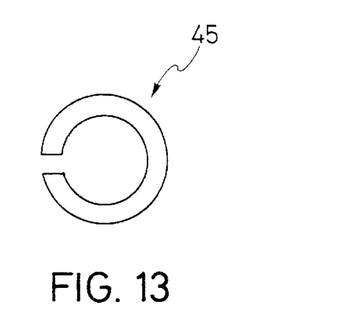
FIG. 13 is an end elevational view of the retaining member illustrated in FIG. 12.

Referring now to FIGS. 12–19, the structures of the recess 35 and retaining ring 45 will now be discussed in more detail. Specifically, as seen in FIGS. 12 and 13, retaining ring 45 preferably has a square or rectangular cross-section, while recess 35 has a corresponding shape to secure retaining ring 45 therein and to limit axial movement of retaining ring 45. Retaining ring 45 is preferably a C-shaped ring that is removably coupled to first end section 34 in a conventional manner. Retaining ring 45 is mounted on first end section after engagement member 26 is mounted on sliding surface 37b to retain engagement member 26 on first end section 34.

Figure 14:
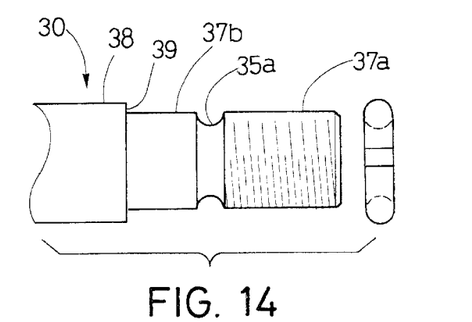
FIG. 14 is an enlarged partial side elevational view of a modified first portion of the hub axle and a modified retaining member of the hub illustrated in FIGS. 1–6 in accordance with a preferred embodiment of the present invention.
Figure 15:
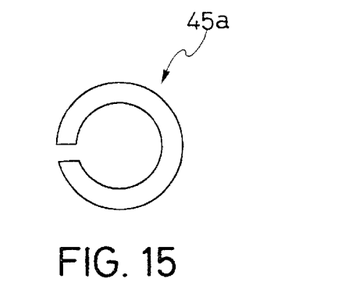
FIG. 15 is an end elevational view of the retaining member illustrated in FIG. 14.
Figure 16:
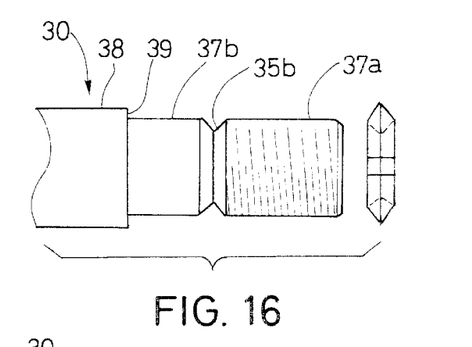
FIG. 16 is an enlarged partial side elevational view of a modified first portion of the hub axle and a modified retaining member of the hub illustrated in FIGS. 1–6 in accordance with a preferred embodiment of the present invention.
Figure 17:
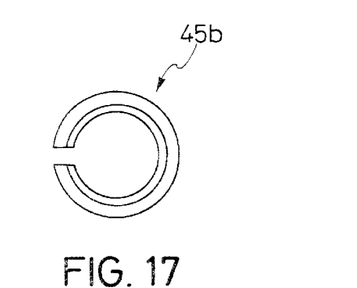
FIG. 17 is an end elevational view of the retaining member illustrated in FIG. 16.
Figure 18:
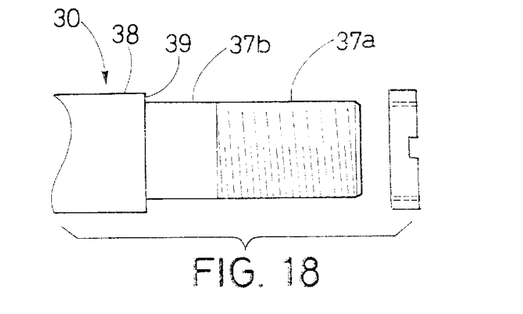
FIG. 18 is an enlarged partial side elevational view of a modified first portion of the hub axle and a modified retaining member of the hub illustrated in FIGS. 1–6 in accordance with a preferred embodiment of the present invention.
Figure 19:
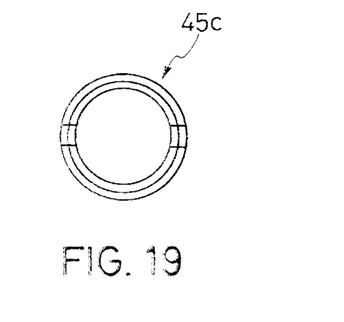
FIG. 19 is an end elevational view of the retaining member illustrated in FIG. 18.

Of course, retaining rings with different structures can be used in accordance with the present invention as needed and/or desired without departing from the scope of the present invention. In any case, the structure of first end section 34 should be modified to accommodate different retaining rings as needed and/or desired. For example, a curved recess 35a and a circular cross-section retaining member 45a are illustrated in FIGS. 14 and 15 in accordance with the present invention. Additionally, a V-shaped recess 35b and a diamond-shaped cross-section retaining member 45b are illustrated in FIGS. 16 and 17 in accordance with the present invention. Finally, a threaded retaining member 45c for use without a recess is illustrated in FIGS. 18 and 19 in accordance with the present invention. Of course it is not always necessary to modify first end section 34 when using different retaining rings. For example, retaining ring 45a could be used in recess 35.

Referring again to FIGS. 5 and 6, freewheel 24 basically includes an inner tubular body 80, an outer tubular body 82 coaxially mounted on inner tubular body 80, a first bearing assembly 84, a second bearing assembly 86, a third bearing assembly 88 and a one-way clutch 90. Freewheel 24 is relatively conventional in the art. Thus, freewheel 24 will not be discussed or illustrated in detail herein, except as modified in accordance with the preferred embodiments of the present invention.

First and second bearing assemblies 84 and 86 of freewheel 24 rotatably couple inner tubular body 80 to outer tubular body 84. Third bearing assembly 88 rotatably couples inner tubular body 80 about second portion 32 of hub axle 20. One-way clutch 90 is coupled between inner tubular body 80 and outer tubular body 84 so as to allow one way rotation between inner and outer tubular bodies 80 and 82.

Inner tubular body 80 of freewheel 24 is releasably and non-rotatably coupled to outer tubular portion 50 of hub body 22 via engagement member 26 when hub 18 is assembled and coupled rear fork 15. As mentioned above, freewheel 24 is coupled to rear hub 18 and many parts of freewheel 24 are relatively conventional.

In the preferred embodiment, outer tubular body 82 has seven sprockets 19e non-rotatably mounted to the external surface of outer tubular body 82. The spacing between sprockets 19e are maintained by a plurality of spacers in a conventional manner. Accordingly, in the preferred embodiment, freewheel 24 can be considered a sprocket support member. Alternatively, inner tubular body 80 can also be considered the sprocket support member since inner tubular body 80 indirectly supports sprockets 19e. In any case, freewheel 24 has a portion releasably and non-rotatably coupled to outer tubular portion 50 of hub body 22 when hub 18 is assembled and coupled rear fork 15.

Of course, it will be apparent to those skilled in the art from this disclosure that freewheel 24 could have more/fewer sprockets 19e as needed and/or desired. For example, freewheel 24 could have a single sprocket 19e coupled thereto. Moreover, it will be apparent to those skilled in the art from this disclosure that an alternate sprocket support member can be provided if needed and/or desired. For example, a simplified sprocket support member could be provided that does not include one-way clutch 90 or other parts of freewheel 24. Accordingly, a "sprocket support member" as used herein includes any member(s), which directly or indirectly supports at least one sprocket.

Referring still to FIGS. 5 and 6, inner tubular body 80 will now be discussed in more detail. Preferably, inner tubular body 80 is constructed of a rigid lightweight material, such as cast aluminum, titanium, steel, etc. Inner tubular body 80 has a step-shaped configuration with an axially extending bore defining a step-shaped internal surface. Basically, inner tubular body 80 has a first inner section 92, a second inner section 94 and an annular wall 96 extending between first inner section 92 and second inner section 94. First inner section 90 has a first effective diameter, while second inner section 94 has a second effective diameter that is larger than the first diameter of the first inner section 92.

First inner section 92 is a tubular section coupled to an inner race of second bearing assembly 86 for rotation therewith. The internal diameter of first inner section 92 is slightly larger than the external diameter of second portion 32, which supports freewheel 24. Annular wall 96 extends radially outward from first inner section 92 to second inner section 94 to provide a space for one-way clutch 90. Second inner section 94 is a tubular section with a set of teeth or splines 95 formed about its internal surface. Second inner section 94 and splines 95 form a splined engagement flange of the sprocket support member (i.e. inner tubular member 80 or entire freewheel 24). Teeth 95 extend radially inwardly from second inner section 94. Teeth 95 are sized and configured to non-rotatably and releasably engage first teeth 61 of engagement member 58.

Referring still to FIGS. 5 and 6, outer tubular body 82 will now be discussed in more detail. Outer tubular body 82 is preferably formed as a one-piece, unitary member constructed of a substantially hard, rigid material. For example, outer tubular body 80 can be constructed of a lightweight metallic material such as aluminum or titanium or a slightly heavier material such as steel. Outer tubular body 82 has an external surface with a plurality of splines 100 extending around its periphery for non-rotatably securing sprockets 19e thereon in a conventional manner. Each of the splines 100 has an abutment stopper 102 extending radially outwardly therefrom. The abutment stoppers 102 limit axial movement of the sprockets 19e on the external surface of outer tubular body 82 in a conventional manner.

One-way clutch 90 is conventional and includes a pawl spring and a pair of pawls (not shown) located 180° apart from each other on the pawl spring. One-way clutch 90 also includes portions of inner and outer tubular bodies 80 and 82 in a conventional manner. In particular, one-way clutch 90 includes an annular groove and a pair of pawl seats of inner tubular body 80 and ratchet teeth of outer tubular body 82. The pawl spring is located within groove for securing the pawls in the pawl seats in a conventional manner. The pawls normally engage the ratchet teeth such that outer tubular body 82 can rotate in one direction about the longitudinal axis but cannot rotate in the other direction in a conventional manner.

Referring to FIGS. 2–4 and 20–23, initial assembly and operation of rear hub 18 will now be discussed in more detail. Preferably, second portion 32 of hub axle 20 has freewheel 24 already mounted thereon, and hub body 22 is basically assembled. First portion 30 is inserted into through bore 74 of inner sleeve portion 52 until first end section 34 extends from hub body 22. Engagement member 26 is then arranged on sliding surface 37b of first end section 34. Then, retaining ring 45 is mounted in recess 35 of first end section 34.

Figure 20:
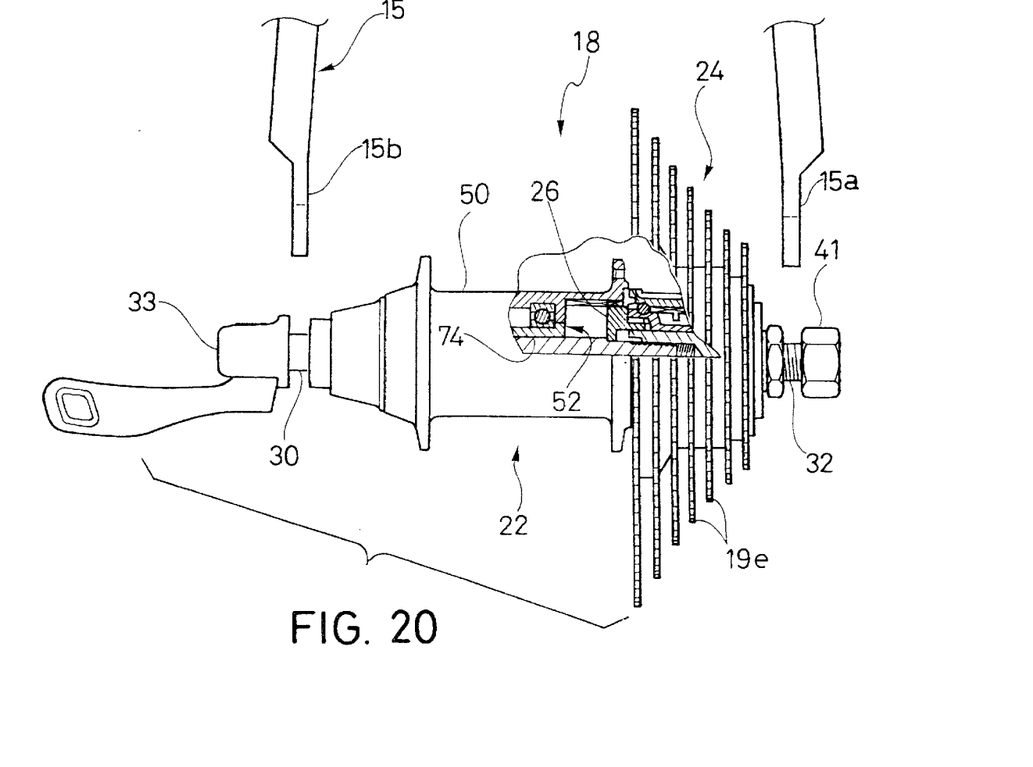
FIG. 20 is a side elevational view of the rear hub illustrated in FIGS. 1–6, prior to mounting the assembled hub on the rear fork of the bicycle with portions broken away to show the position of the engagement member.
Figure 21:
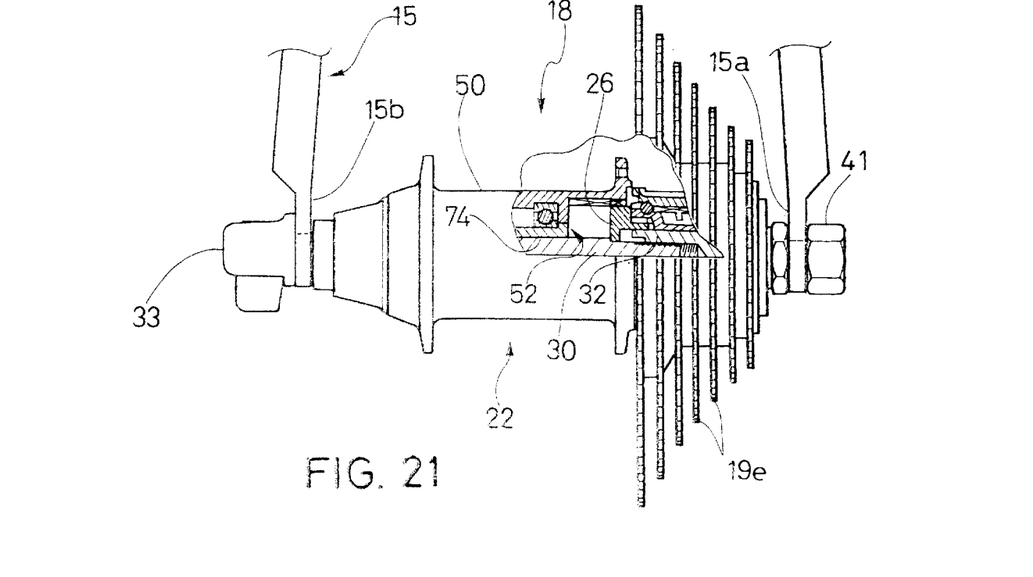
FIG. 21 is a side elevational view of the rear hub illustrated in FIGS. 1–6 and 19, after mounting the assembled hub on the rear fork of the bicycle with portions broken away to show the position of the engagement member.

Hub body 22 is now assembled. First portion 30 of hub axle 20 is then threadedly coupled to second portion 32 to move engagement member 26 toward freewheel 24 until first and second portions 30 and 32 are coupled together. Rotation of first portion 30 relative to second portion 32 is prevented when abutment surface 65 contacts inner tubular member 80. Hub 18 is now assembled and ready for use as seen in FIG. 20. Hub 18 can then be secured to mounting portions 15a and 15b of rear fork 15 in a conventional manner by tightening nut 41 and quick release mechanism 33 as illustrated in FIG. 21. Moreover, hub body 22 can be easily separated from freewheel 24 if needed and/or desired by simply unscrewing first portion 30 from second portion 32.

Figure 22:
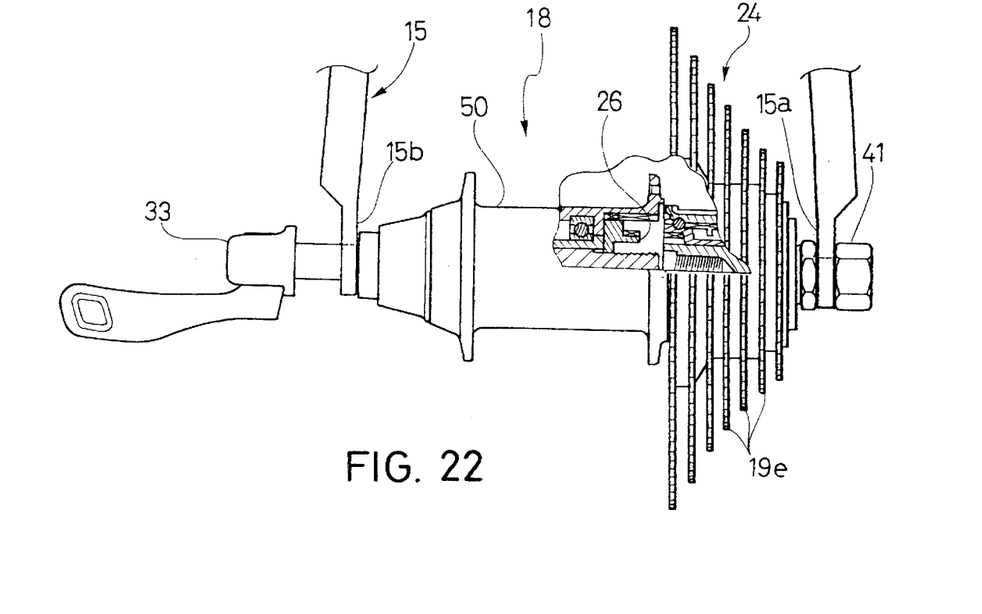
FIG. 22 is a side elevational view of the rear hub illustrated in FIGS. 1–6, 20 and 21, with one side of the rear hub released from the rear fork of the bicycle and the hub body disengaged from the freewheel with portions broken away to show the position of the engagement member.
Figure 23:
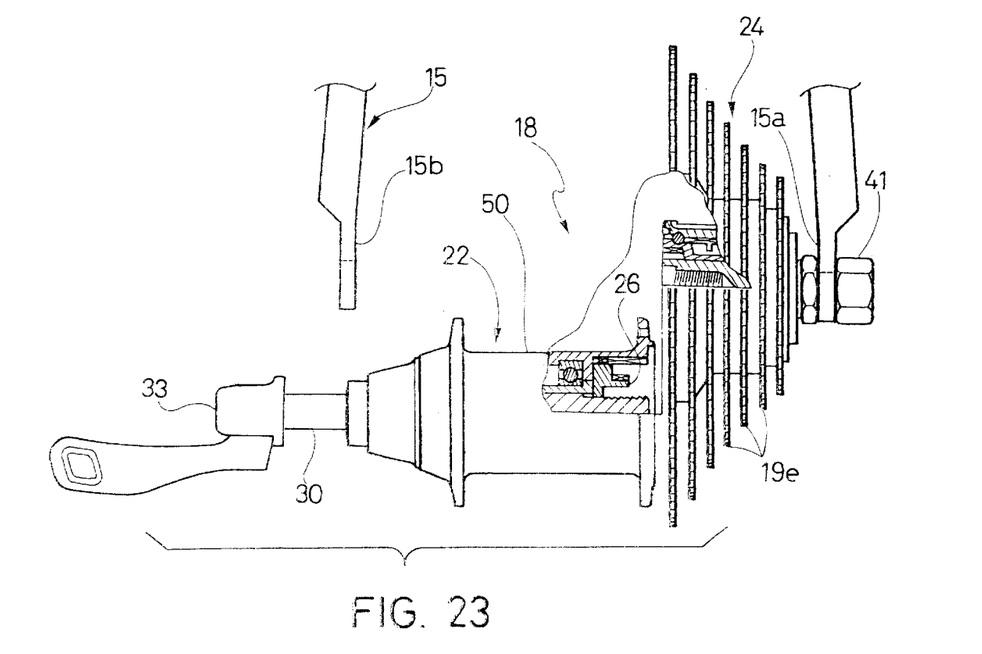
FIG. 23 is a side elevational view of the rear hub illustrated in FIGS. 1–6 and 20–22, with the hub body completely removed from the rear fork of the bicycle with portions broken away to show the position of the engagement member.

If the rear wheel 16 needs to be removed from rear fork 15 for repair or adjustment, hub body 22 can be easily removed from rear fork 15 without removing freewheel 24 from rear fork 15. Specifically, quick release mechanism 33 is released and first portion 30 of hub axle 20 is rotated to release first and second portions 30 and 32 from each other. When first portion 30 is rotated (i.e. in the release or counter-clockwise direction), engagement member 26 will be moved axially away from freewheel 24 into a disengage position as seen in FIG. 22. Then, hub body 22 can be completely removed from freewheel 24 and rear fork 15 for repair, adjustment or replacement.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle hub comprising:
a hub axle having a first portion and a second portion releasably coupled to said first portion;
a hub body having an outer tubular portion and an interior passageway with said first portion of said hub axle being rotatably supported therein;
a sprocket support member mounted on said second portion of said hub axle; and
an engagement member non-rotatably coupling said outer tubular portion to said sprocket support member in an engaged position, said engagement member being axially movable by said hub axle relative to said hub body between said engaged position and a disengaged position.

2. The bicycle hub according to claim 1, wherein said first portion of said hub axle is threadedly coupled to said second portion of said hub axle.

3. The bicycle hub according to claim 1, wherein said first portion of said hub axle includes an abutment shoulder arranged to move said engagement member from said disengaged position to said engaged position.

4. The bicycle hub according to claim 3, wherein said first portion of said hub axle includes a retaining ring arranged thereon to move said engagement member from said engaged position to said disengaged position.

5. The bicycle hub according to claim 4, wherein said first portion of said hub axle is threadedly coupled to said second portion of said hub axle such that rotation of said first portion relative to said second portion moves said engagement member between said engaged and disengaged positions.

6. The bicycle hub according to claim 4, wherein said retaining ring is threadedly mounted on said first portion of said hub axle.

7. The bicycle hub according to claim 1, wherein said first portion of said hub axle includes a first abutment surface arranged to axially move said engagement member in a first direction.

8. The bicycle hub according to claim 7, wherein said first portion of said hub axle includes a second abutment surface arranged to axially move said engagement member in a second direction opposite said first direction.

9. The bicycle hub according to claim 1, wherein said first portion of said hub axle includes a retaining ring releasably mounted thereon.

10. The bicycle hub according to claim 1, wherein said hub body includes an inner tubular portion rotatably coupled on said first portion of said hub axle.

11. The bicycle hub according to claim 1, wherein said first portion of said hub axle includes a quick release mechanism mounted on a free end of said first portion.

12. The bicycle hub according to claim 1, wherein said sprocket support member includes a freewheel.

13. A bicycle hub comprising:
a hub axle having a first portion and a second portion releasably coupled to said first portion, said first portion including an abutment shoulder and a retaining ring;
a hub body having an outer tubular portion and an interior passageway with said first portion of said hub axle being rotatably supported therein;
a sprocket support member mounted on said second portion of said hub axle; and
an engagement member non-rotatably coupling said outer tubular portion to said sprocket support member in an engaged position, said engagement member being axially movable by said hub axle between said engaged position and a disengaged position, said abutment shoulder of said first portion of said hub axle arranged to move said engagement member from said disengaged position to said engaged position, said retaining ring of said first portion of said hub axle arranged thereon to move said engagement member from said engaged position to said disengaged position, said engagement member including an annular contact portion rotatably mounted on said first portion of said hub axle, said contact portion arranged between said abutment shoulder and said retaining ring.

14. The bicycle hub according to claim 13, wherein said contact portion has an axial thickness that is less than an axial distance formed between said abutment shoulder and said retaining ring to allow relative axial movement of said engagement member on said first portion of said hub axle.

15. The bicycle hub according to claim 14, wherein said axial thickness of said contact portion is equal to about one half of the axial distance between said abutment shoulder and said retaining ring.

16. A bicycle hub comprising:
a hub axle having a first portion and a second portion releasably coupled to said first portion;
a hub body having an outer tubular portion and an interior passageway with said first portion of said hub axle being rotatably supported therein;
a sprocket support member mounted on said second portion of said hub axle; and
an engagement member non-rotatably coupling said outer tubular portion to said sprocket support member in an engaged position, said engagement member being axially movable by said hub axle between said engaged position and a disengaged position, said outer tubular portion including an internal splined engagement section and said engagement member including a first splined engagement portion non-rotatably and slidably coupled to said engagement section.

17. The bicycle hub according to claim 16, wherein said first engagement portion of said engagement member has an axial length smaller than an axial length of said engagement section of said outer tubular portion.

18. The bicycle hub according to claim 16, wherein said engagement member has a second splined engagement portion extending from said engagement member to slidably and non-rotatably engage a splined engagement flange of said sprocket support member.

19. The bicycle hub according to claim 16, wherein said engagement member has a maximum axial length smaller than an axial length of said engagement section of said outer tubular portion such that said engagement member can be retracted into an internal recess of said outer tubular portion.

20. The bicycle hub according to claim 19, wherein said engagement member has a first abutment surface arranged to contact an internal abutment surface of said internal recess of said outer tubular portion.

21. The bicycle hub according to claim 20, wherein said first abutment surface of said engagement member is axially aligned with a free edge of said first engagement portion.

22. The bicycle hub according to claim 20, wherein said engagement member has a second abutment surface arranged to contact said sprocket support member.

23. The bicycle hub according to claim 22, wherein said second abutment surface of said engagement member is axially spaced from a free edge of said first engagement portion.

24. The bicycle hub according to claim 23, wherein said engagement member has a second splined engagement portion extending from said second abutment surface to slidably and non-rotatably engage a splined engagement flange of said sprocket support member.

25. A bicycle hub comprising:

a hub axle having a first portion and a second portion releasably coupled to said first portion;

a hub body having an outer tubular portion and an interior passageway with said first portion of said hub axle being rotatably supported therein, said hub body including an inner tubular portion rotatably coupled on said first portion of said hub axle;

a sprocket support member mounted on said second portion of said hub axle; and an engagement member non-rotatably coupling said outer tubular portion to said sprocket support member in an engaged position, said engagement member being axially movable by said hub axle between said engaged position and a disengaged position, said inner tubular portion including an external flange axially aligned with an internal flange of said outer tubular portion such that said internal and external flanges form a stop surface to prevent axial movement of said engagement member within an internal recess of said outer tubular portion.

* * * * *